United States Patent
Margalit et al.

(10) Patent No.: US 9,720,803 B2
(45) Date of Patent: Aug. 1, 2017

(54) METHODS AND APPARATUS FOR DEBUGGING OF REMOTE SYSTEMS

(71) Applicant: HEWLETT PACKARD ENTERPRISE DEVELOPMENT LP, Houston, TX (US)

(72) Inventors: Nadav Margalit, Yehud (IL); Michael Mishalov, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 0 days.

(21) Appl. No.: 14/765,321

(22) PCT Filed: Jan. 31, 2013

(86) PCT No.: PCT/US2013/024116
§ 371 (c)(1),
(2) Date: Jul. 31, 2015

(87) PCT Pub. No.: WO2014/120200
PCT Pub. Date: Aug. 7, 2014

(65) Prior Publication Data
US 2015/0370686 A1    Dec. 24, 2015

(51) Int. Cl.
G06F 11/36    (2006.01)

(52) U.S. Cl.
CPC ........ G06F 11/3636 (2013.01); G06F 11/362 (2013.01); G06F 11/3664 (2013.01)

(58) Field of Classification Search
CPC .......................... G06F 11/3664; G06F 11/362
See application file for complete search history.

(56) References Cited

U.S. PATENT DOCUMENTS

| 5,630,049 A | 5/1997 | Cardoza et al. |
| 5,892,941 A * | 4/1999 | Khan .................. G06F 11/3664 703/22 |
| 7,673,180 B1 | 3/2010 | Chen et al. |

(Continued)

FOREIGN PATENT DOCUMENTS

| DE | EP 1408410 A1 * | 4/2004 | ............ G06F 11/362 |
| EP | 1408410 A1 | 4/2004 | |

(Continued)

OTHER PUBLICATIONS

Extended European Search Report received in EP Application No. 13873828.1, Sep. 5, 2016, 7 pages.

(Continued)

Primary Examiner — Yolanda L Wilson
(74) Attorney, Agent, or Firm — Mannava & Kang, P.C.

(57) ABSTRACT

Methods and apparatus for debugging of remote systems are disclosed. An example apparatus includes an activator to establish a connection between a first computer system and a second computer system, a data fetcher to transfer values of a first set of data elements from the second computer system to the first computer system via the connection, an executor to execute a first software code on the first computer system using the transferred values of the first set of data elements after the connection is closed, and a debugger to debug the first software code on the first computer system after the executor executes the first software code on the first computer system.

20 Claims, 6 Drawing Sheets

(56) References Cited

U.S. PATENT DOCUMENTS

| | | | |
|---|---|---|---|
| 7,783,799 B1 | 8/2010 | Sivertsen | |
| 8,015,201 B1 | 9/2011 | Harris | |
| 8,046,743 B1 | 10/2011 | Righi et al. | |
| 8,621,118 B1* | 12/2013 | Nulkar | G06F 11/26 710/15 |
| 2002/0056047 A1* | 5/2002 | Lehman | G06F 11/3656 726/26 |
| 2004/0123271 A1 | 6/2004 | Bindewald et al. | |
| 2005/0216895 A1 | 9/2005 | Tran | |
| 2006/0174225 A1 | 8/2006 | Bennett et al. | |
| 2007/0016696 A1* | 1/2007 | Jerrard-Dunne | G06F 17/3089 709/250 |
| 2007/0174715 A1 | 7/2007 | Kilian | |
| 2011/0004790 A1 | 1/2011 | Rossmann et al. | |
| 2011/0088015 A1 | 4/2011 | Shillington et al. | |
| 2011/0252404 A1* | 10/2011 | Park | G06F 11/3664 717/124 |
| 2012/0102468 A1 | 4/2012 | Lefurgy | |
| 2013/0262930 A1* | 10/2013 | Nakamura | G06F 11/3664 714/27 |

FOREIGN PATENT DOCUMENTS

| | | |
|---|---|---|
| WO | WO-0223344 A2 | 3/2002 |
| WO | WO-2011016595 A1 | 2/2011 |

OTHER PUBLICATIONS

Allinea, Scalable Offline Debugging, 5 pages, http://www.allinea.com/Portals/90122/docs/Allinea_Whitepaper_Nov11.pdf.

Korean Intellectual Property Office, International Search Report and Written Opinion, Oct. 28, 2013, 12 pages, Daejeon Metropolitan City, Republic of Korea.

Mickens, J., Rivet: Browser-agnostic Remote Debugging for web Applications, Jun. 2012, 13 pages, https://www google com/url?sa=t&rct=j&q=&esrc=s&source=web&cd=5&cad=rja&ved=0CD.

Robbins, John, DebugLive debugger, Whitepaper, 4 pages, http://www.debuginfo.com/debuggerscenarios.html.

\* cited by examiner

METHODS AND APPARATUS FOR DEBUGGING OF REMOTE SYSTEMS

BACKGROUND

When software code is written, updated, and maintained, it may need to be debugged in order to ensure proper functionality. Software source code often contains errors or "bugs" that cause the software code to not function properly or as expected when it is compiled and/or executed. In order for the software code to function properly, these bugs may be identified and/or corrected by a programmer through the process of debugging. Debugging can be assisted by the use of a debugger. A debugger is a software application that a programmer may use to debug software code. A debugger typically contains tools to assist a programmer in the debugging process, such as allowing the software code to be executed one line at a time, allowing the programmer to examine the contents of certain data structures associated with the software code, and so forth.

DETAILED DESCRIPTION

Figure 1:
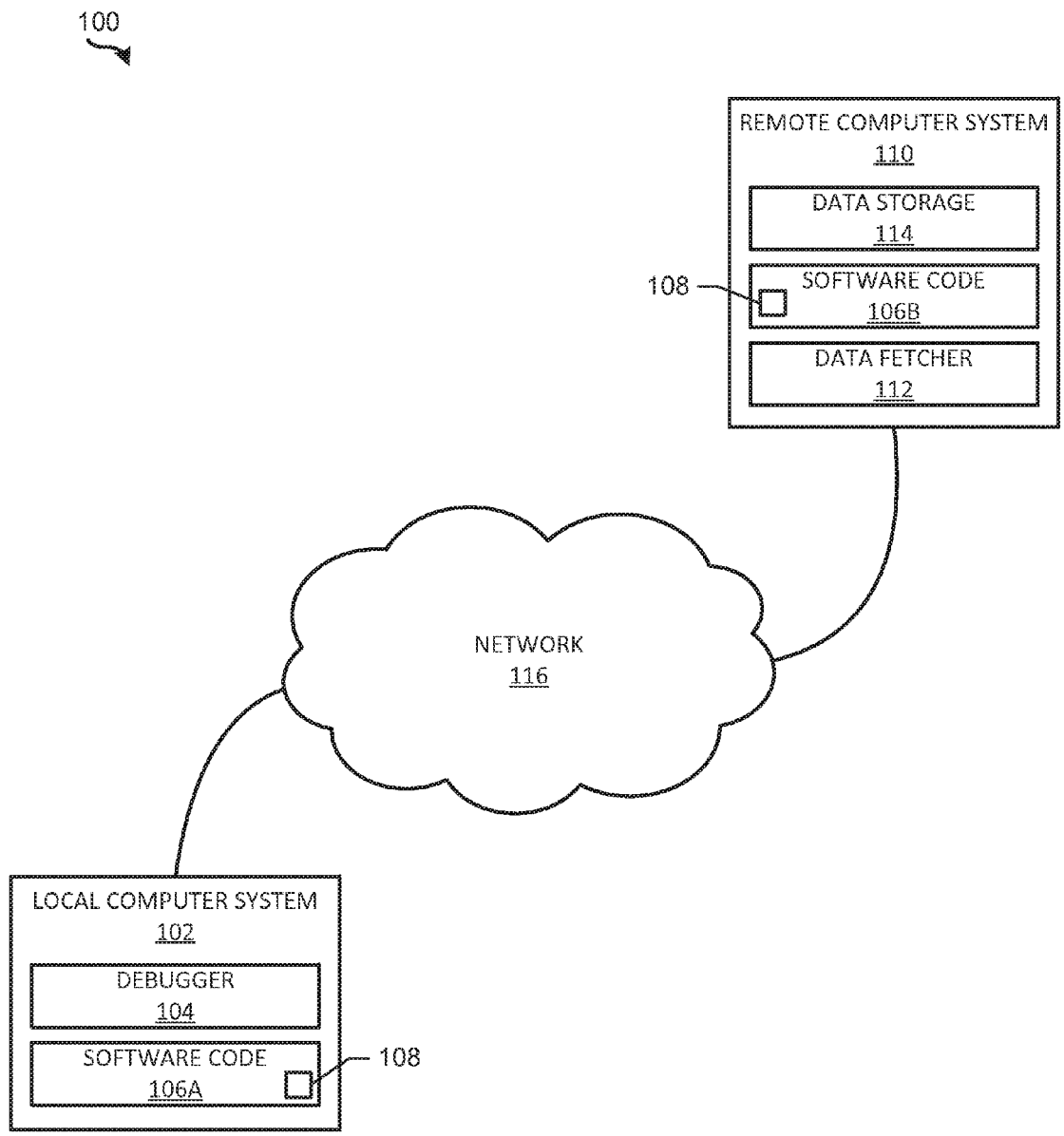
FIG. 1 is a block diagram of an example debugging system constructed in accordance with the teachings of this disclosure.

Often, software debugging is performed by a programmer who is physically present at the computer system that contains the software code to be debugged. However, it is sometimes not possible, not practical and/or not convenient for the programmer to be physically present at the computer system that contains the software code to be debugged. In these situations, a programmer may be present at one computer system (i.e., a local computer system), which is connected via a network to another computer system (i.e., a remote computer system) at a different location that contains the software code that is to be debugged. Using known networking software, the programmer can operate the remote computer system from the local computer system. This allows the programmer to debug the software code on the remote computer system using a debugger on the remote computer system while being physically present at the local computer system.

Software code on the remote computer system can be remotely debugged by a programmer who is physically present at the local computer system by establishing a network connection between the local computer system and the remote computer system. However, maintaining a network connection between the local computer system and the remote computer system while the software code is being debugged may consume significant resources on the remote computer system. This resource usage can potentially prevent the remote computer system from running other applications or processes.

As an alternative, software code can be debugged entirely on a local computer system, wherein software code on the local computer system is the same as the software code on the remote computer system at the time when a programmer starts debugging. After debugging on the local computer system is complete, any changes made to the software code on the local computer system can be made to the software code on the remote computer system. This approach of debugging software entirely on the local computer system may not maintain an open connection between the local computer system and the remote computer system while debugging. However, this approach does not perform debugging using the data on the remote computer system.

When software code is executed, it typically manipulates some amount of data. For example, software code might access data from a database, create several variables or other data objects to use while the software code is executing and add, delete or modify data from the database. As such, when the software code is executing it operates on data that may vary during and/or as a result of execution of the software code. Software code often responds differently when operating on different data. For example, certain bugs in software code might only appear when the software code is operating on certain data. Therefore, in order to effectively debug software code on a remote computer system from a local computer system, examples disclosed herein provide the local computer system with access to data on the remote computer system. In some examples, the data connection between the local computer system and the remote computer system is not maintained throughout the debugging to reduce the resource load on the remote computer system.

Example methods, apparatus, and/or articles of manufacture disclosed herein provide a mechanism for offline debugging of a remote computer system As used herein, the term offline is expressly defined to mean a state in which a data connection utilized for retrieving data for the debugging from a remote computer system is closed such that there can be no further communication on the data connection without taking an action to establish the data connection. In particular, examples disclosed herein allow for debugging of software code on a remote computer system from a local computer system, using data from the remote computer system without maintaining an open connection between the local computer system and the remote computer system. As described in greater detail below, certain (e.g., key) sections of the software code are marked to indicate that those sections contain data elements that will likely be of interest (e.g., important) for debugging. This marked software code is present on both the local computer system and the remote computer system.

In examples disclosed herein, the example software code to be debugged resides on both the example local computer system and the example remote computer system. During normal operation, the example software code executes on the example remote computer system. When the example software code is to be debugged, in examples disclosed herein the example local computer system establishes a connection to the example remote computer system and requests marked data. The example remote computer system then copies a data snapshot including the requested data to the example local computer system. In examples disclosed herein, after the requested data is transferred from the example remote computer system to the example local computer system, the connection between the local computer system and the remote computer system is closed. The example software code is then executed on the example local computer system using the data copied from the example remote computer system while the connection remains closed, thereby reducing the usage of network resources. In examples disclosed herein, after the example software code completes execution on the example local computer system and/or while the software code is executing on the local computer system, the software code is debugged on the local computer system using a debugger.

Because an open connection is not maintained between the example local computer system and the example remote computer system during the full duration of the debugging process (e.g., the open connection is only maintained during the time it takes to copy a data snapshot from the remote computer system to the local computer system), the use of the remote computer system's resources is reduced (e.g., minimized). Moreover, by executing the example software code on the example local computer system using the same data that is present on the example remote computer system, the software code executes on the local computer system in the same manner that the software code executes on the remote computer system. Accordingly, any bugs that would be present upon execution of the example software code on the example remote computer system will also be present upon execution of the software code on the example local computer system. As such, the example software code can be debugged on the example local computer system just as if the software code were being debugged on the example remote computer system.

In some examples disclosed herein, if updated data from the example remote computer system is needed while the example software is being debugged on the example local computer system, the local computer system establishes a new connection to the remote computer system to receive the updated data (e.g., a new data snapshot) from the remote computer system. After debugging of the example software code on the example local computer system is complete, in some disclosed examples a copy of the debugged software code is transferred to the example remote computer system so that the remote computer system has the same debugged software code as the local computer system.

FIG. 1 is a block diagram of an example debugging system 100 constructed in accordance with the teachings of this disclosure. The example system 100 of FIG. 1 includes a local computer system 102 and a remote computer system 110. In the illustrated example, the local computer system 102 is able to communicate with the remote computer system 110 and vice versa via a network 116. The example network 116 allows a connection to be selectively made and/or torn down between the example local computer system 102 and the example remote computer system 110. The example network 116 may be implemented using any type of public or private network such as, but not limited to, the Internet, a telephone network, a local area network (LAN), a cable network, and/or a wireless network. To enable communication via the example network 116, each of the example local computer system 102 and the example remote computer system 110 of FIG. 1 includes a communication interface that enables connection to the network via Ethernet, a digital subscriber line (DSL), a telephone line, a coaxial cable and/or a wireless connection, etc.

The example local computer system 102 of FIG. 1 includes a debugger 104 and software code 106A. The example remote computer system 110 includes a data fetcher 112, a data storage 114 and software code 106B. The example software code 106A on the example local computer system 102 is initially similar to (e.g., identical to) the example software code 106B on the example remote computer system 110. The example software code 106A on the example local computer system 102 and/or the example software code 106B on the example remote computer system 110 include marked sections 108. The marked sections 108 identify variables, objects and/or other data elements that are to be copied from the example remote computer system 110 to the example local computer system 102 prior to debugging the example software code 106A on the local computer system 102.

The example debugger 104 of the example local computer system 102 is used to debug the example software code 106A resident on the local computer system 102. The example debugger 104 establishes a connection between the example local computer system 102 and the example remote computer system 110 via the example network 116. The example debugger 104 copies data from the remote computer system 110 to the local computer system 102 and stores the copied data. The example debugger 104 compiles and/or executes the example software code 106A on the example local computer system 102 using the data copied from the example remote computer system 110. The example debugger 104 detects and/or corrects errors in the example software code 106A on the example local computer system 102.

The example software code 106B executes on the example remote computer system 110 during normal operation of the remote computer system 110. In some examples, the software code 106B on the remote computer system 110 is identical to the software code 106A on the local computer system 102. In the illustrated example, the software code 106A, 106B is written in the JAVA programming language. Alternatively, the example software code 106A, 106B may be written in any other programming language that can be compiled and/or executed on the local computer system 102 and the remote computer system 110.

As mentioned above, the example software code 106A on the example local computer system 102 and/or the example software code 106B on the example remote computer system 110 contain marked sections 108. The marked sections 108 of the example software code 106A, 106B identify data elements, such as variables and/or other objects that are to be copied from the example remote computer system 110 to the example local computer system 102 when the software code 106A is to be debugged on the local computer system 102. The marked sections 108 may be identified in any desired fashion (e.g., manually, automatically, etc.).

In the illustrated example, the marked sections 108 are identified using JAVA annotations. JAVA annotations are a feature of the JAVA programming language that allows metadata to be added to JAVA software code. JAVA annotations can be used to supply metadata to variables, methods, classes and/or other elements in JAVA code. Annotations are implemented in JAVA code using the '@' symbol followed immediately by an annotation type name, such as, for example @Override, @Deprecated or @SuppressWarnings. @Override, @Deprecated and @SuppressWarnings are three annotation types built into the JAVA language. An annotation type is followed in JAVA code by the element or elements to be annotated.

In addition to the built-in annotation types, custom user-defined annotations can also be used in JAVA code. JAVA annotations can be used for several purposes including providing documentation and providing information to the compiler among other possibilities. In the illustrated example, JAVA annotations are used to identify the example marked sections 108 of the example software code 106A, 106B to identify data elements in the software code 106A, 106B that are to be copied from the remote computer system 110 to the local computer system 102 to facilitate debugging.

In some examples, JAVA annotations added to the software code 106A, 106B indicate to a compiler that software instructions are to be inserted (i.e., injected) into the source code 106A at the positions of the annotations. The injected code sections indicate that values for identified data elements are to be loaded from the example data proxy 202 that contains the data snapshot transferred from the example remote computer system 110. Accordingly, when the compiled code 106A is executed on the example local computer system 102 during debugging, the previously injected code sections cause the execution to utilize the data in the example data proxy 202, which has been cloned from the relevant data on the remote computer system 110.

Although the example software code 106A, 106B includes JAVA annotations to identify the marked sections 108, any other method of identifying marked sections 108 in the example software code 106A, 106B could be additionally and/or alternatively utilized. Similarly, although the above examples are implemented in JAVA, the example software code 106A, 106B and the marked sections 108 may be implemented in any past, present and/or future programming language. The marked sections 108 of the example software code 106A, 106B allow for the values of the identified data elements to be copied from the example remote computer system 110 to the example local computer system 102 while the software code 106B is executing on the remote computer system 110. For example, the values of the data elements identified in the marked sections 108 of the software code 106B might be made accessible from the data storage 114. The example marked sections 108 of the example software code 106A, 106B are marked during the software development process of the software code 106A, 106B.

In the illustrated example, the marked sections 108 identify data elements of interest (e.g., key data elements) utilized by the example software code 106A, 106B. For example, the marked sections 108 might identity data elements used by the example software code 106A, 106B that are only accessible by the example remote computer system 110 such as data from a database on the remote computer system 110. Identifying data elements of interest whose values are to be copied from the example remote computer system 110 to the example local computer system 102 prior to debugging allows the local computer system 102 to automatically obtain the data and to execute the example software code 106A to get the same or similar results that would be obtained by executing the example software code 106B on the remote computer system 110. The example software code 106A can then be debugged on the example local computer system 102 using the example debugger 104.

The example data fetcher 112 on the example remote computer system 110 retrieves data elements to be copied from the example remote computer system 110 to the example local computer system 102 upon request by the example activator 200 of the example debugger 104. In the illustrated example of FIG. 1, the data fetcher 112 retrieves data elements from the data storage 114. After retrieving the requested data elements, the example data fetcher 112 causes the retrieved data elements to be packaged and sent to the example local computer system via the example network 116. Alternatively, the data elements may be sent in any other manner.

The example data storage 114 is a file or other data structure on the example remote computer system 110 that stores data elements to be copied from the remote computer system 110 to the example local computer system 102. In the illustrated example, the JAVA annotations in the marked sections 108 of the software code 106B specify that the values of data elements identified in the marked sections 108 that are to be stored in the data storage 114 while the software code 106B executes on the remote computer system 110. During execution of the example software code 106B on the example remote computer system 110, the values of data elements in the software code 106B, including the data elements identified in the marked sections 108, might change according to the instructions (e.g., data manipulations) in the software code 106B. In the illustrated example, as the values of the data elements identified in the marked sections 108 of the example software code 106B change, the JAVA annotations cause the corresponding values in the example data storage 114 to be updated as well. Because the data elements are to be retrieved from the example data storage 114, the example data fetcher 112 retrieves data elements from the data storage 114 while the example software code 106B executes on the example remote computer system 110 without disturbing the execution of the software code 106B.

In some examples, the data storage 114 is the heap of the remote computer system 110, which is the area of memory on a computer system where data elements used by a JAVA application are stored. In other examples, the data storage 114 could be another area of memory of the remote computer system 110 and/or a combination of one or more registers or other data storage structures on the remote computer system 110 where data elements to be transferred to the local computer system 102 are stored. In foregoing examples, data elements identified in the marked sections 108 of the software code 106B are copied from the data storage 114 to the local computer system 102 by the data fetcher 112.

In some examples, the software code 106A, 106B does not include marked sections 108. In these examples, other methods of selecting data elements to be copied from the remote computer system 110 to the local computer system 102 are utilized such as manually inserting code into the software code 106A on the local computer system 102, manually selecting data elements to be copied from the remote computer system 110 to the local computer system 102, and so forth.

Figure 2:
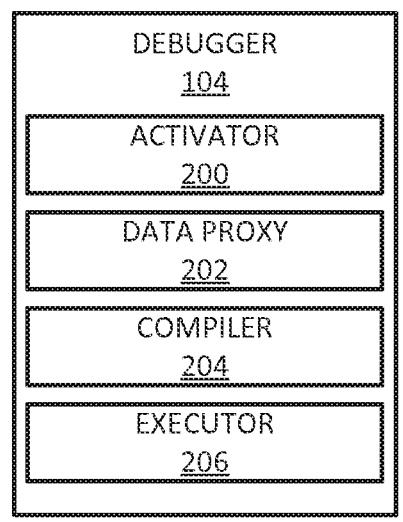
FIG. 2 is a block diagram of an example implementation of the example debugger of FIG. 1.

FIG. 2 is a block diagram of an example implementation of the example debugger 104 of FIG. 1. The example debugger 104 of FIG. 2 includes an activator 200, a data proxy 202, a compiler 204, and an executor 206.

The example activator 200 of FIG. 2 initiates a data connection between the example local computer system 102 and the example remote computer system 110 and makes a request for the remote computer system 110 to transfer data (e.g., a data snapshot) to the local computer system 102. The data copied from the example remote computer system 110 to the example local computer system 102 includes values for data elements identified in the marked sections 108 of the example software code 106A. In the illustrated example, the activator 200 specifies which of the data elements identified in the marked sections 108 of the software code 106B are to be copied from the remote computer system 110 to the local computer system 102. In other examples, the activator 200 may instruct the remote computer system 110 to copy every data element identified in the marked sections 108 of the software code 106B to the local computer system 102 after the activator 200 establishes a connection between the local computer system 102 and the remote computer system 110.

The example activator 200 performs the above described actions while the example software code 106B executes on the example remote computer system 110 without interrupting the execution of the software 106B on the remote computer system 110. In response to completion of the transfer of the requested data from the example remote computer system 110 to the example local computer system 102, the example activator 200 closes the connection between the local computer system 102 and the remote computer system 110. At a later time, a new connection may be established by the example activator 200 and updated data (e.g., an updated data snapshot) may be transferred from the remote computer system 110 to the local computer system 102.

The example data proxy 202 of FIG. 2 is a file or other data structure that stores the data elements copied from the example remote computer system 110 to the example local computer system 102. When the example software code 106B executes on the example remote computer system 110, some of the data elements in the software code 106B are populated with values from sources available to the remote computer system 110, such as, for example a database on the remote computer system 110. However, when the example software code 106A executes on the example local computer system 102, the software code 106A may not have access to the resources available to the example remote computer 110 because the software code 106A only executes on the local computer system 102 after the connection to the remote computer system 110 is closed. Instead, the example debugger 104 populates the appropriate data elements identified in the marked sections 108 of the example software code 106A with values from the example data proxy 202 when the software code 106A executes on the example local computer system 102. The data in the example data proxy 202 on the example local computer system 102 acts as a proxy for data accessible by the example remote computer system 110. Accordingly, the example software code 106A executes on the local computer system 102 using the same data as the example software code 106B accesses on the remote computer system 110.

In the illustrated example, the compiler 204 compiles the software code 106A on the local computer system 102 after the activator 200 closes the connection between the local computer system 102 and the remote computer system 110. In the illustrated example, during compilation, the compiler 204 inserts software instructions into the software code 106A at the positions of the JAVA annotations in the software code 106A. In some examples, the compiler 204 may not compile the software code 106A (e.g., where the software code 106A is precompiled and/or where the software code 106A is written in a programming language that does not need to be compiled to be executed, such as a scripting language). In some examples, the compiler 204 is implemented through the commercially available software application Eclipse™ or another integrated development environment (IDE).

In the illustrated example, the executor 206 executes the software code 106A on the local computer system 102 after and/or while the compiler 204 compiles the software code 106A. In other examples, the executor 206 executes the software code 106A on the local computer system 102 after the activator 200 closes the connection with the remote computer system 110 (e.g., where the software code 106A does not need to be compiled to be executed). In some examples, the executor 206 is implemented through Eclipse™ or another IDE.

After the example software code 106A completes execution on the example local computer system 102 or while the software code 106A is executing on the local computer system 102, bugs in the software code 106A can be identified and/or the software code 106A can be debugged. In some examples, the debugger 104 provides tools to assist in the modification of the software code 106A to correct "bugs." In some examples, after the software code 106A is debugged, the debugged software code 106A is copied to the remote computer system in place of the software code 106B such that the software code 106A on the local computer system is identical to the software code 106B on the remote computer system 110. In some examples, after the executed software code 106A modifies the data in the data proxy 202 on the local computer system 102, the modified data is stored on the local computer system 102, such as in a file or a database, so that it can later be retrieved. In other examples, after the executed software code 106A modifies the data in the data proxy 202 on the local computer system 102, the modified data is stored to a mock object (e.g., NULL) and cannot be later retrieved.

While an example manner of implementing the debugging system 100 has been illustrated in FIGS. 1 and 2, one or more of the elements, processes and/or devices illustrated in FIG. 1 and/or FIG. 2 may be combined, divided, re-arranged, omitted, eliminated and/or implemented in any other way. Further, the example debugger 104, the example data fetcher 112, the example data storage 114, the example activator 200, the example data proxy 202, the example compiler 204, the example executor 206 and/or, more generally, the example debugging system 100 of FIG. 1 may be implemented by hardware, software, firmware and/or any combination of hardware, software and/or firmware. Thus, for example, any of the example debugger 104, the example data fetcher 112, the example data storage 114, the example activator 200, the example data proxy 202, the example compiler 204, the example executor 206 and/or, more generally, the example debugging system 100 of FIG. 1 could be implemented by one or more circuit(s), programmable processor(s), application specific integrated circuit(s) (ASIC(s)), programmable logic device(s) (PLD(s)), microprocessor(s), hardware processor(s), and/or field programmable logic device(s) (FPLD(s)), etc. When any of the system or apparatus claims of this patent are read to cover a purely software and/or firmware implementation, at least one of the example debugger 104, the example data fetcher 112, the example data storage 114, the example activator 200, the example data proxy 202, the example compiler 204, the example executor 206 and/or, more generally, the example debugging system 100 of FIG. 1 is hereby expressly defined to include a tangible computer readable storage medium such as a memory, DVD, CD, Blu-ray, etc. storing the software and/or firmware. Further still, the example debugger 104, the example data fetcher 112, the example data storage 114, the example activator 200, the example data proxy 202, the example compiler 204, the example executor 206 and/or, more generally, the example debugging system 100 of FIG. 1, and/or may include more than one of any or all of the illustrated elements, processes and devices.

Figure 3:
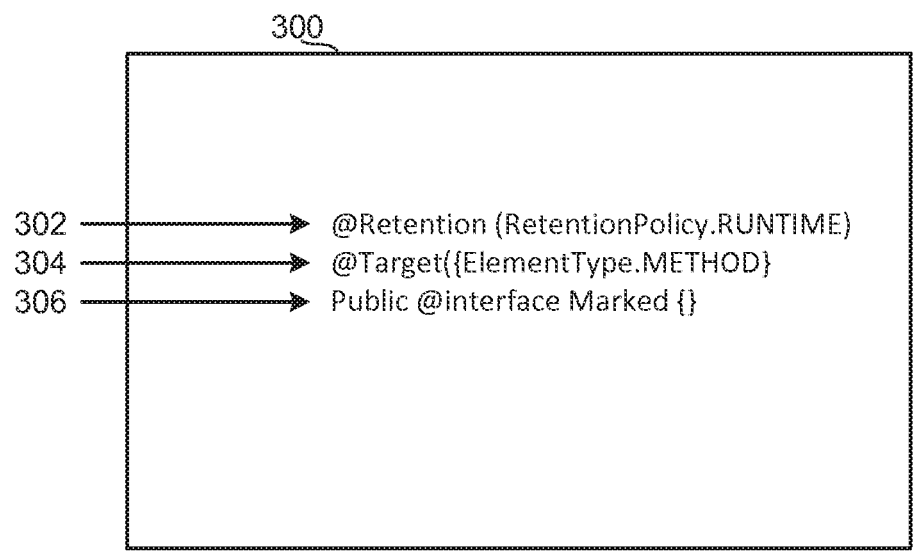
FIG. 3 is JAVA code representative of an annotation declaration for use in the example debugging system of FIG. 1.

FIG. 3 illustrates an example JAVA annotation declaration 300 that may be part of the example software code 106A, 106B. The example JAVA annotation declaration 300 of FIG. 3 declares an annotation type named 'Marked.' Line 302 of the example of FIG. 3 uses the '@Retention' command to specify that the custom '@Marked' annotation is to be retained at run-time to allow marked elements to be accessed at run-time. Line 304 of the example of FIG. 3 uses the '@Target' command to specify that the custom '@Marked' annotation applies to methods. Line 306 of the example of FIG. 3 uses the '@interface' command to name the custom annotation as 'Marked.' A definition of the '@Marked' annotation could specify, for example, that all elements annotated with the '@Marked' annotation are to be available to an external application while the JAVA code is executing. The '@Marked' annotation may then be utilized in the JAVA code to mark sections of data to be copied from the example remote computer system 110 to the example local computer system 102 for use in debugging. By making the values of the marked sections 108 available to an external application and/or computer system at run-time, the values of the marked sections during run-time can be copied to the example local computer system 102 while the example software code 106B executes on the example remote computer system 110.

Figure 4:
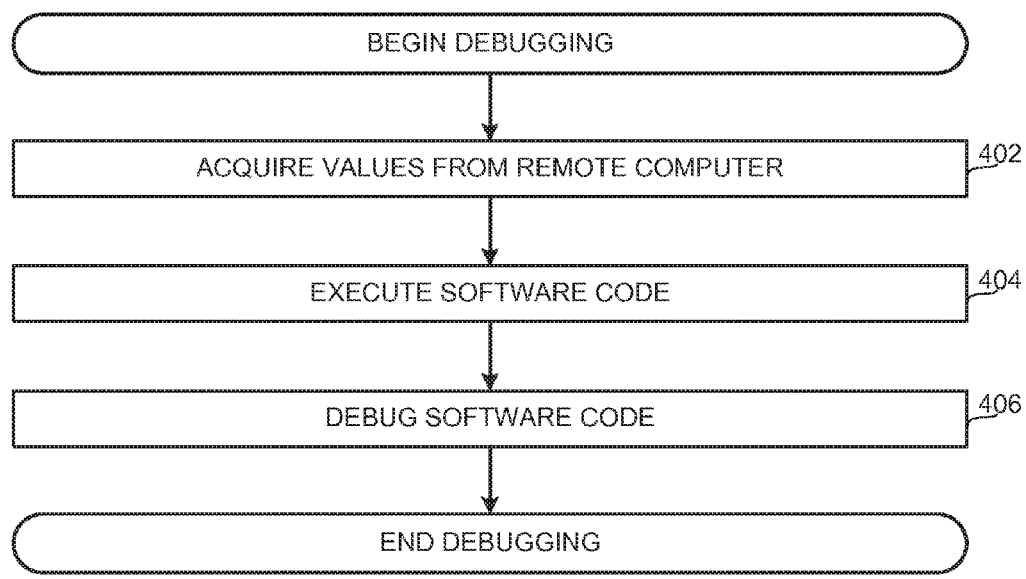
FIGS. 4 and 5 are flowcharts representative of example machine readable instructions that may be executed to implement the example debugging system of FIG. 1.

FIGS. 4 and/or 5 are flowcharts representative of example machine readable instructions for implementing the example debugging system 100 of FIG. 1 and/or FIG. 2. In the example flowcharts of FIGS. 4 and/or 5, the machine readable instructions comprise program(s) for execution by a processor such as the processor 612 shown in the example computer 600 discussed below in connection with FIG. 6. The program(s) may be embodied in software stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program(s) is described with reference to the flowcharts illustrated in FIGS. 4 and/or 5, many other methods of implementing the example debugging system 100 of FIG. 1 may alternatively be used. For example, the order of execution of the blocks may be changed, and/or some of the blocks described may be changed, eliminated, or combined.

As mentioned above, the example processes of FIGS. 4 and/or 5 may be implemented using coded instructions (e.g., computer readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable storage medium is expressly defined to include any type of computer readable storage device and/or disk and to exclude propagating signals. Additionally or alternatively, the example processes of FIGS. 4 and/or 5 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable storage medium is expressly defined to include any type of computer readable storage device and/or disk and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

FIG. 4 begins when the example local computer system 102 initiates debugging by acquiring data elements from the example remote computer system 110 (block 402). For example, the data proxy 202 of the debugger 104 acquires data elements of interest (e.g., marked data elements) from the remote computer system 110 (block 402). The example local computer system 102 (e.g., the executor 206) then executes the example software code 106A after closing the connection between the local computer system 102 and the example remote computer system 108 (block 404). The example local computer system 102 (e.g., the debugger 104) then debugs the software code (block 406) and the example process of FIG. 4 ends.

Figure 5:
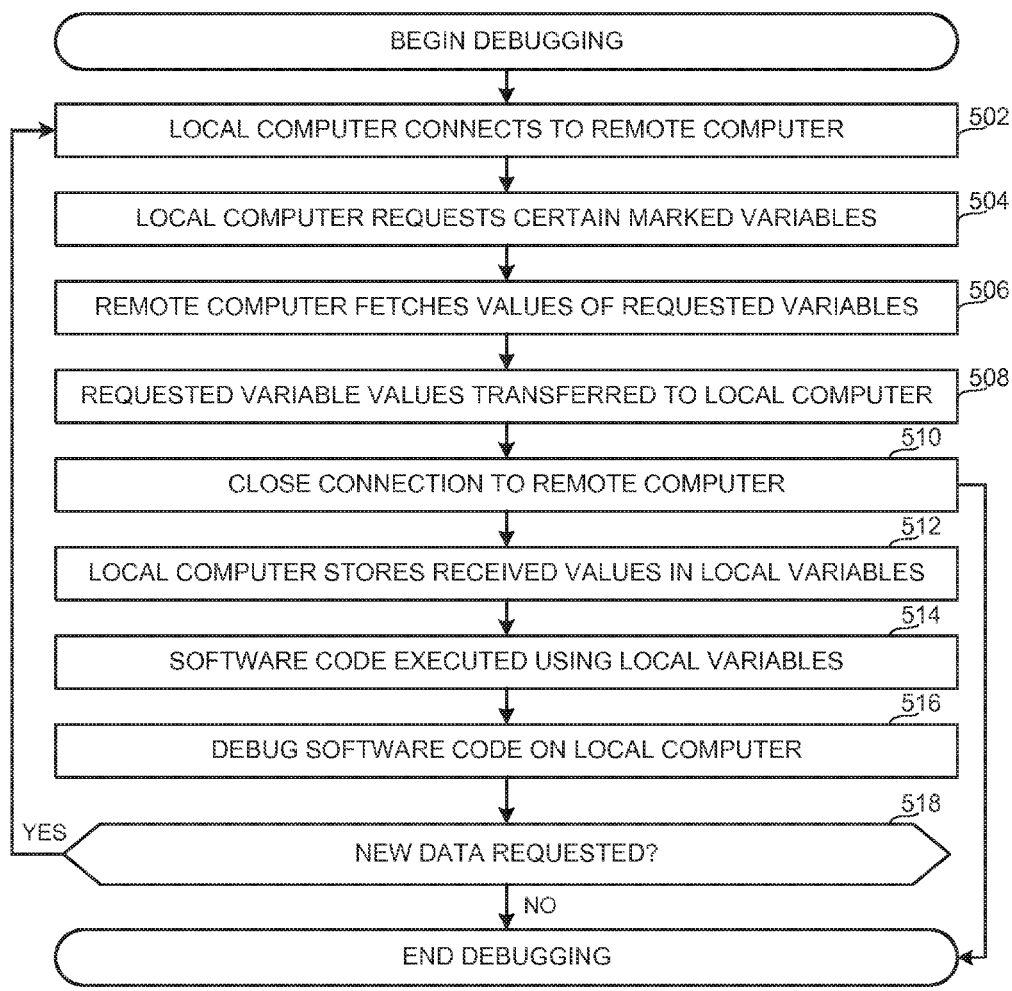

FIG. 5 is a more detailed flowchart representative of example machine readable instructions for implementing the example debugging system 100 of FIG. 1 and/or FIG. 2. FIG. 5 begins when the example activator 200 initiates debugging by establishing a connection between the example local computer system 102 and the example remote computer system 110 via the example network 116 (block 502). The example activator 200 then requests that data elements identified within the marked sections 108 of the example software code 106B be copied from the example remote computer system 110 to the example local computer system 102 (block 504). After the example remote computer system 110 receives this request from the example activator 200, the example data fetcher 112 retrieves a data snapshot of the requested data elements from the example data storage 114 (block 506). The retrieved data snapshot is then copied to the example data proxy 202 on the example local computer system 102 (block 508). In response to receiving the data snapshot at the example data proxy 202 on the example local computer system 102, the example activator 200 terminates the connection between the example local computer system 102 and the example remote computer system 110 (block 510).

Once the example data proxy 202 receives a copy of the data snapshot from the example remote computer system 110 and the connection to the remote computer system 110 is closed, the example debugger 104 loads the values of the data elements in the example data proxy 202 into the appropriate data elements of the example software code 106A (block 512). The example software code 106A on the example local computer system 102 is then executed using the data loaded from the example data proxy 202 (block 514). In some examples, the software code 106B on the remote computer system 110 continues to execute throughout this process. Because the data in the example data proxy 202 was copied from the example remote computer system 110, the execution of the example software code 106A on the example local computer system 102 will produce the same results as the execution of the example software code 106B on the remote computer system 110. By closing the connection to the example remote computer system 110, the execution and debugging of the example software code 106A on the local computer system 102 does not consume the resources of the remote computer system 110.

After the example software code 106A completes execution on the example local computer system 102 and/or while the software code 106A is executing, the software code 106A is debugged (block 516). In some examples, the debugger 104 provides tools to assist with debugging of the software code 106A. The example software code 106A is debugged entirely on the example local computer system 102 and no data connection to the example remote computer system 110 is maintained while the software code 106A is debugged. The example debugging system 100 then determines whether a request is made to retrieve new, additional and/or updated data from the example remote computer system 110 (block 518). If such a request is made, then control passes back to block 502 and a new connection is established between the example local computer system 102 and the example remote computer system 110. If such a request is not made, the example process of FIG. 5 ends.

Figure 6:
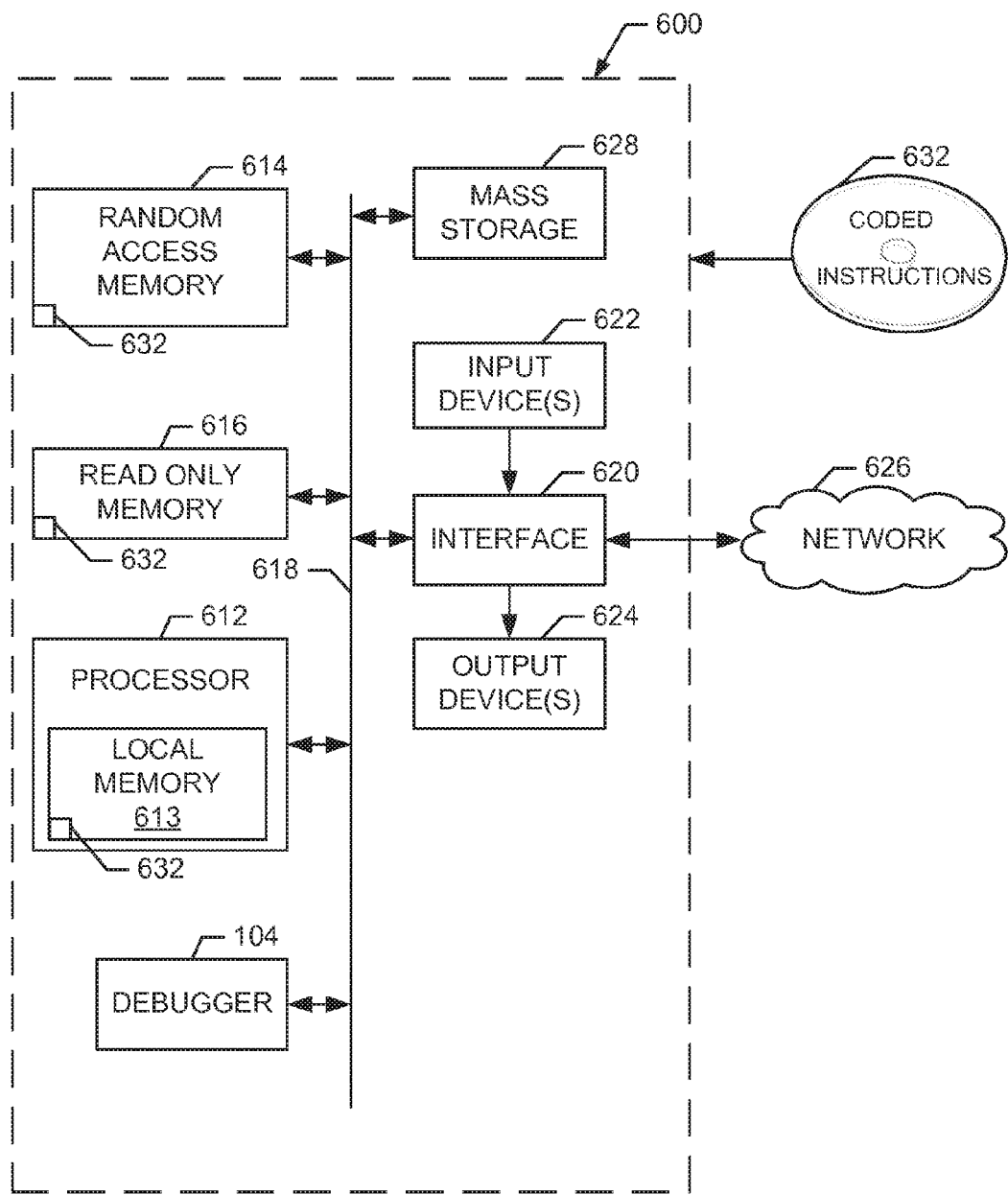
FIG. 6 is a block diagram of an example processing system capable of executing the example machine readable instructions of FIGS. 4 and 5 to implement the example debugging system of FIG. 1.

FIG. 6 is a block diagram of a processor platform 600 capable of executing the instructions of FIGS. 4 and/or 5 to implement the example debugging system 100 of FIG. 1. The processor platform 600 can be, for example, a server, a personal computer, an Internet appliance, a DVD player, a CD player, a Blu-ray player, a gaming console, a personal video recorder, a smart phone, a tablet, a printer, or any other type of computing device.

The processor platform 600 of the instant example includes a processor 612. As used herein, the term "processor" refers to a logic circuit capable of executing machine readable instructions. For example, the processor 612 can be implemented by one or more microprocessors or controllers from any desired family or manufacturer.

The processor 612 includes a local memory 613 (e.g., a cache) and is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller. The processor 612 of the illustrated example provides commands to the debugger 104 of FIGS. 1 and 2 to implement the debugger.

The processor platform 600 also includes an interface circuit 620. The interface circuit 620 may be implemented by any type of interface standard, such as an Ethernet interface, a universal serial bus (USB), and/or a PCI express interface.

One or more input devices 622 are connected to the interface circuit 620. The input device(s) 622 permit a user to enter data and commands into the processor 612. The input device(s) can be implemented by, for example, a keyboard, a mouse, a touchscreen, a track-pad, a trackball, isopoint and/or a voice recognition system.

One or more output devices 624 are also connected to the interface circuit 620. The output devices 624 can be implemented, for example, by display devices (e.g., a liquid crystal display, a cathode ray tube display (CRT), a printer and/or speakers). The interface circuit 620, thus, typically includes a graphics driver card.

The interface circuit 620 also includes a communication device such as a modem or network interface card to facilitate exchange of data with external computers via a network 626 (e.g., an Ethernet connection, a digital subscriber line (DSL), a telephone line, coaxial cable, a cellular telephone system, etc.). In the illustrated example, the network 626 may be used to implement the example network 116 of FIG. 1.

The processor platform 600 also includes one or more mass storage devices 628 for storing software and data. Examples of such mass storage devices 628 include floppy disk drives, hard drive disks, compact disk drives and digital versatile disk (DVD) drives.

The coded instructions 632 of FIG. 6 may be stored in the mass storage device 528, in the volatile memory 514, in the non-volatile memory 616, and/or on a removable storage medium such as a CD or DVD. In the illustrated example, the coded instructions 632 may be used to implement the example software code 106A of FIG. 1.

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

What is claimed is:

1. A first computer system comprising:
   a processor; and
   a non-transitory storage medium storing instructions executable on the processor to:
   establish a connection between the first computer system and a second computer system;
   retrieve values of a set of data elements from the second computer system via the connection;
   execute a first software code on the first computer system using the retrieved values of the set of data elements, in response to closing the connection between the first computer system and the second computer system; and
   debug the first software code on the first computer system after the executing of the first software code on the first computer system.

2. The first computer system of claim 1, wherein the first software code contains the set of data elements and the set of data elements are marked in the first software code using code annotations in the first software code.

3. The first computer system of claim 2, wherein the instructions are executable on the processor to:
   store the retrieved values of the set of data elements in a data proxy; and
   inject code instructions into the first software code at positions of the code annotations, the injected code instructions indicating that values of the set of data elements are to be retrieved from the data proxy when the first software code is executed in the first computer system.

4. The first computer system of claim 3, wherein the instructions are executable on the processor to:
   during execution of the first software code on the first computer system, populate the set of data elements with the values of the set of data elements in the data proxy.

5. The first computer system of claim 3, wherein the injecting of the code instructions into the first software code is performed by a compiler executed in the first computer system.

6. The first computer system of claim 1, wherein after the debugging of the first software code, the instructions are executable on the processor to re-establish the connection between the first computer system and the second computer system to retrieve updated values of the set of data elements from the second computer system for use in debugging the first software code again on the first computer system.

7. The first computer system of claim 1, wherein the first software code is written in the JAVA programming language.

8. The first computer system of claim 1, wherein the values of the set of data elements retrieved from the second computer system comprise values of the set of data elements marked using code annotations in a second software code on the second computer system.

9. The first computer system of claim 8, wherein the values of the set of data elements retrieved from the second computer system comprise values stored in a data storage of the second computer system in response to execution of the second software code on the second computer system that causes storing, in the data storage of the second computer system, of updated values of the set of data elements marked using the code annotations in the second software code.

10. A method comprising:
establishing a connection between a first computer system and a second computer system, wherein the first computer system contains a first software code, and the second computer system contains a second software code, and wherein each of the first software code and second software code contains a set of data elements;
acquiring, by the first computer system, values of the set of data elements from the second computer system via the connection, the acquired values of the set of data elements provided in response to marking of the set of data elements using code annotations in the second software code in the second computer system;
executing the first software code on the first computer system using the acquired values of the set of data elements after the connection between the first computer system and the second computer system is closed; and
debugging the first software code on the first computer system abased on executing the first software code on the first computer system.

11. The method of claim 10, wherein the acquired values of the set of data elements are stored at the second computer system in response to execution of the second software code in the second computer system that causes storing, in a data storage of the second computer system, of updated values of the set of data elements marked using the code annotations in the second software code.

12. The method of claim 10, further comprising executing the first software code on the first computer system in response to closing the connection between the first computer system and the second computer system.

13. The method of claim 10, further comprising copying the debugged first software code from the first computer system to the second computer system.

14. The method of claim 10, wherein the first software code and the second software code are initially identical.

15. The method of claim 10, wherein the set of data elements are marked in the first software code using code annotations in the first software code, the method further comprising:
storing the acquired values of the set of data elements in a data proxy in the first computer system; and
injecting, in the first computer system, code instructions into the first software code at positions of the code annotations in the first software code, the injected code instructions indicating that values of the set of data elements are to be retrieved from the data proxy when the first software code is executed in the first computer system.

16. A non-transitory machine readable storage medium comprising instructions that, when executed, cause a first computer system to at least:
acquire values of a first set of data elements from a second computer system;
execute a first software code on the first computer system using the values of the first set of data elements in response to a closing of a connection between the first computer system and the second computer system; and
debug the first software on the first computer system after executing the first software code on the first computer system.

17. The non-transitory machine readable storage medium of claim 16, wherein the first set of data elements are marked using code annotations in the first software code, and wherein the instructions when executed cause the first computer system to further:
store the acquired values of the set of data elements in a data proxy in the first computer system; and
inject code instructions into the first software code at positions of the code annotations, the injected code instructions indicating that values of the first set of data elements are to be retrieved from the data proxy when the first software code is executed in the first computer system.

18. The non-transitory machine readable storage medium of claim 16, wherein the instructions, when executed, cause the first computer system to copy the debugged first software code from the first computer system to the second computer system.

19. The non-transitory machine readable storage medium of claim 16, wherein the values of the first set of data elements acquired from the second computer system comprise values of the first set of data elements marked using code annotations in a second software code on the second computer system.

20. The non-transitory machine readable storage medium of claim 19, wherein the values of the first set of data elements acquired from the second computer system comprise values stored in a data storage of the second computer system in response to execution of the second software code on the second computer system that causes storing, in the data storage of the second computer system, of updated values of the first set of data elements marked using the code annotations in the second software code.

* * * * *